Sept. 28, 1965 H. L. COX, JR 3,209,229
SYSTEM FOR UTILIZING INTELLIGENCE SIGNALS
TO PERFORM CONTROL FUNCTIONS
Filed May 31, 1961 2 Sheets-Sheet 1

WITNESSES
John E. Healy, Jr.
James F. Young

INVENTOR
Henry L. Cox, Jr.
BY Benjamin DeWitt
ATTORNEY

United States Patent Office 3,209,229

Patented Sept. 28, 1965

3,209,229

SYSTEM FOR UTILIZING INTELLIGENCE SIGNALS TO PERFORM CONTROL FUNCTIONS

Henry L. Cox, Jr., Wilkinsburg, Pa., assignor to Westinghouse Electric Corporation, East Pittsburgh, Pa., a corporation of Pennsylvania Filed May 31, 1961, Ser. No. 113,715
8 Claims. (Cl. 320—1)

This invention relates generally to electrical control systems and more particularly to systems and apparatus for distributing control signals or intelligence bearing signals from a single signal source to a plurality of signal storage elements and for utilizing the signals stored by such elements to control delivery of current to a plurality of output circuits or loads.

While the present invention may find application in various systems for utilizing intelligence bearing signals to perform control functions, it has particular utility in connection with space distributed display of visual indicia, such as in the display of television, radar, facsimile and the like images. For convenience the invention is hereafter described in the particular embodiments which have been found most suitable for display of video signals in television type apparatus. It is, of course, to be expressly understood that the invention may have broad application in various control systems other than television, and its application is not restricted to any particular system or final purpose.

In U.S. Patent No. 2,875,380, issued February 24, 1959, to Pierre M. G. Toulon, and assigned to the same assignee as the present application, there is disclosed an image display apparatus or screen which may comprise thousands of separate spatially distributed electroluminescent light producing elements each having associated therewith at least one intensity control element. The intensity control elements set forth in the above application take the form of non-linear dielectric capacitors including a dielectric material such as barium titanite, for example. Such capacitive elements are responsive to a control signal or control potential to govern the light power potential applied to, and the light emitted from each electroluminescent element. The light intensity which will be emitted from a given incremental area of the display screen can be selected or determined during any given time interval by applying a constant bias potential to the non-linear capacitor associated with the particular electroluminescent element.

In the use of such display screens for television, radar and the like systems it is necessary to provide high speed switching means for distributing intelligence bearing signal from a single source or input channel to a large plurality of individual channels extending to the separate intensity control elements. In conventional television broadcast systems such as that presently in use in the United States, the discrete video signals representative of the brightness of separate picture elements are transmitted and received as time sequential elementary variations in the amplitude of the radio frequency carrier wave. After demodulation of the carrier the video signal is comprised of time sequential incremental components having amplitude values representative of the brightness of picture elements along horizontal lines of the televised picture. The signal representative of the brightness of a particular incremental portion of the picture display is an ephemeral or fleetingly existent voltage amplitude. At the display screen, it is desirable to have light emitted continuously from each picture element during the whole image frame time in proportion to the time sequential instantaneous values of the video signal wave corresponding to the desired brightness of the various picture elements. By arranging for storage of a signal corresponding to the instantaneous value of the vido wave, it is possible to substantially increase the average brightness of the display and completely eliminate flicker of the type which is inherent in cathode ray television or radar displays.

In order to accomplish the foregoing, a potential corresponding to the discrete video information for a particular picture element can be created instantaneously and retained during the image frame time and then erased or dissipated so as to provide for storage of a second potential corresponding to the desired brightness of the same picture element during the next subsequent frame time. One method of obtaining continuous light output from a particular picture element is to store a potential corresponding to an instantaneous video signal input and utilizing the stored potential to bias a non-linear dielectric capacitive element. The controlled reactance of the non-linear capacitive element is then utilized to control the alternating current power applied to an elementary portion of the electroluminescent image display screen. The foregoing method necessitates extremely high speed distribution of the time sequential incremental video signal components from the common video signal input channel to the multitude of charge storage elements which are electrically associated with the elementary electroluminescent cells of the display screen.

In the prior art, some attention has been given to the problem of high speed distribution of signals from a single channel to a plurality of separate output channels or separate signal storage elements. In one prior art arrangement described in detail in copending application, Serial No. 747,799, filed July 10, 1958, by F. T. Thompson now Patent No. 3,048,824 and assigned to the present assignee, inverse biased semiconductor diodes have been used as pulse actuated switches for periodically connecting different output channels to a common input signal source. While such systems have been entirely satisfactory from the technical standpoint they suffer the practical disadvantage, at the present time, of requiring a very large plurality of relatively expensive semiconductor diodes.

In another prior art arrangement as set forth in detail in U.S. Patent No. 2,474,338 issued June 28, 1949, to P. M. G. Toulon, a large plurality of spatially arrayed needle like spark gap devices have been used as pulse actuated switches for periodically connecting different signal storage elements or different output channels to a common input signal source. Such prior art spark gap switching systems have heretofore been unsuccessful because of (1) excessively large physical dimensions of the array required by the necessity of isolating the ionization of the neighborhood of each spark gap from the next adjacent spark gaps of the array; and (2) the existence of an uncertainty in the conductivity of the ionized spark gap and in the resultant stored potential. It is experimentally demonstrable that when unidirectional pulses are used for initiating spark gap ionization the potential thereby transferred from a signal source to a signal storage capacitor may randomly vary by as much as 30% during successive signal storage procedures.

I have found that when a train or burst of short duration voltage pulses is used, instead of the conventional long duration single pulse, the heretofore experienced random variation in the stored potential is substantially eliminated and the resultant stored potential has been found to be consistently within 10% of its nominal value. Thus, the present invention provides a method and apparatus for eliminating or minimizing the random variations which have heretofore resulted in the stored potential in spark gap signal commutating systems. Furthermore, I have found that the use of a burst of short duration voltage pulses in lieu of a single pulse of the same overall time duration enables the use of physical arrays of spark gaps which have very substantially smaller dimensions than previously thought possible. The physical configuration of the present invention permits construction of a display screen in which the individually controllable screen elements may be as close together as $\frac{1}{16}$ inch between centers with each element being controlled by a voltage which is established through an individual spark gap switch corresponding to the screen element.

It is a primary object of this invention to provide an improved signal distribution system for sequentially applying signals from a common source to a plurality of independent output channels.

It is a further object to provide a signal distribution system of the type described which requires a minimum number of circuit components and a minimum of complexity and which minimizes the degree of uncertainty or random error exhibited in the distributed signal.

It is an additional object of the invention to provide for periodically establishing and maintaining on a potential storage element, a potential corresponding to a predetermined instantaneous amplitude of an information bearing signal.

It is another object of the invention to provide an improved spark gap type of signal commutation system for sequentially distributing an information bearing signal to establish different potentials accurately corresponding respectively to different instantaneous values of the signal and for employing said different potentials to respectively control a plurality of separate functions for periods of time as long as several hours.

The novel features which are believed to be characteristic of the present invention both as to its organization and method of operation, together with further objects and advantages thereof, will be better understood from the following description considered in connection with the accompanying drawing. It is to be expressly understood that the drawing is for the purpose of illustration and description only and is not intended as a definition of the limits of the invention.

Figure 1:
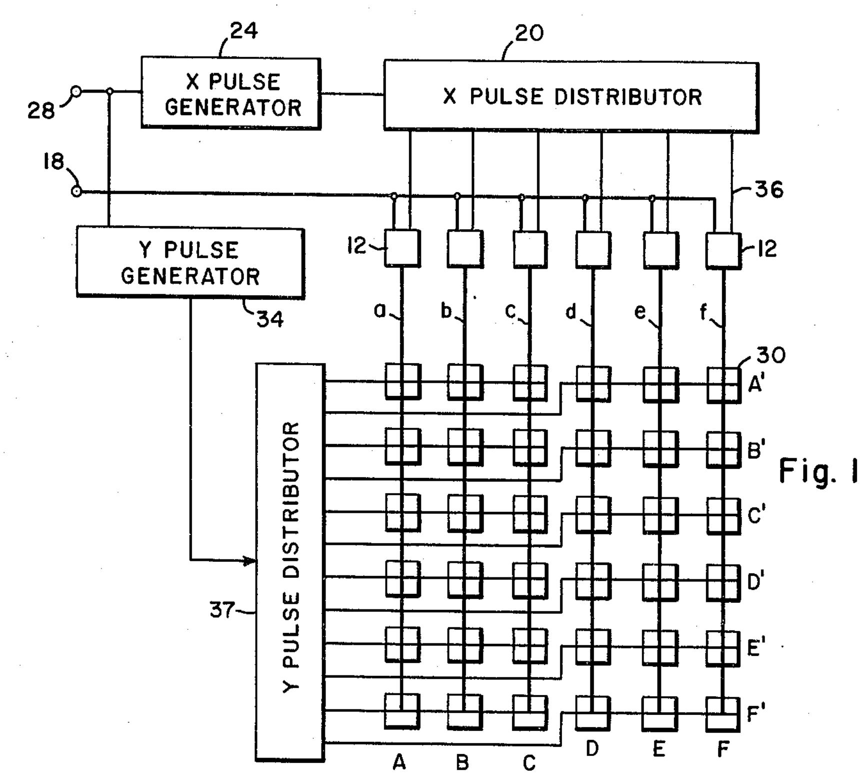
FIGURE 1 is a schematic representation of an image display system embodying and utilizing the present invention.

Referring now to the drawing and to FIGURE 1 in particular, there is shown a quasi-electronic signal distribution system for supplying separate control potentials to the elementary light generating cells of an electroluminescent display screen. The display screen is shown as comprising 36 display elements 30 arranged spatially in six columns A, B, C, D, E, F. And in six rows A′, B′, C′, D′, E′, F′. It is to be understood that the display screen would normally include many thousands of the elements 30 arranged in rows and columns in a similar manner. In the embodiment as shown, the number of rows and columns are limited for convenience of explanation, and may be considered as representing only a small fractional part of an actual display in accordance with the invention. A control signal, which, by way of example, may be a video information bearing signal from the video amplifier of a conventional television receiver circuit is applied to the control signal input terminal 18 and is applied therefrom to a plurality of intermediate switching and storage devices 12 with the control signal being continuously applied to the input of each. Each element 12 may comprise a gate circuit with a signal storage element coupled to its output. A synchronizing signal is applied to input terminal 28 and thence to an X-pulse generator 24 and also to a Y-pulse generator 34. The signal applied to terminal 28 may for convenience be considered as being of the type derivable from the synchronizing signal separation circuit of a conventional television receiver. Signals from X-pulse generator 24 applied to an X-pulse distributor 20 which has a plurality of output circuits 36 for sequential application of switching pulses to the gating circuits of the switching devices 12. As shown in FIG. 1, the heavy lines indicates schematically the paths of the video signal and the resultant video control potentials from the input terminal 18 through the switching and storage devices 12 to the elementary display devices 30. The lighter lines in FIG. 1 indicate the paths of switching signals or switching pulses from the synchronizing signal input terminal 28 to the X-pulse generator and from the X-pulse generator through the X-pulse distributor 20 and by way of its plural output circuits 36 to the intermediate pulse actuated switching devices 12. The lighter lines also indicate the paths of the vertical scan switching signals to the Y-pulse distributing means 37 and from its plural output circuits to the individual display devices 30. The pulse distributors 20 and 37 may comprise pulse delay lines constructed in accordance with practices well known in the art and may be either distributed or lump parameter L–C delay lines. Alternatively, the pulse distributing means 20 and 37 may comprise ultrasonic delay lines, or, preferably, a number of amplitude sensitive pulse generators sequentially activated by a saw tooth or similar voltage waveform.

Each of the elementary light producing devices 30 as shown in FIG. 1 represents the combination of at least one ferro-electric or other non-linear dielectric capacitor and an electroluminescent transducer as described in detail in the aforementioned Toulon Patent 2,875,380 together with a switching and storage device similar to the intermediate switching and storage devices 12.

The overall structural organization and operation of display systems of the general type shown in FIG. 1 have been described in detail in copending application, Serial No. 747,799, aforementioned. Accordingly, no further details are included herein concerning the general system. Rather, the present invention is described hereinafter as it is applicable to the internal structure of one of the elementary signal storage blocks 30 of the system of FIG. 1. Specifically in accordance with the present invention, each one of the block elements 30 of FIG. 1 may comprise a circuit arrangement as shown in FIG. 2.

As may be appreciated from the foregoing a picture display screen having commercially acceptable resolution (of the order of 200 elements per square inch) requires many thousands of separate electrically actuable switch mechanisms. While semiconductor diodes have been successfully employed as pulse actuated switches (as disclosed by the above application, Serial No. 747,799) such devices and the quantities required are extremely expensive. The present invention obviates the use of such expensive switch devices by utilizing individually ionizable gas discharge devices or spark gaps as pulse actuated switch means. As stated heretofore such spark gap switch devices have previously suffered from uncertainty in the degree of conductivity during the conductive interval. In effect, the average resistance of the spark gap has not been accurately predictable and the effective resistance of the gas during one ionization interval has been substantially different from the effective resistance during successive ionization intervals.

Figure 2:
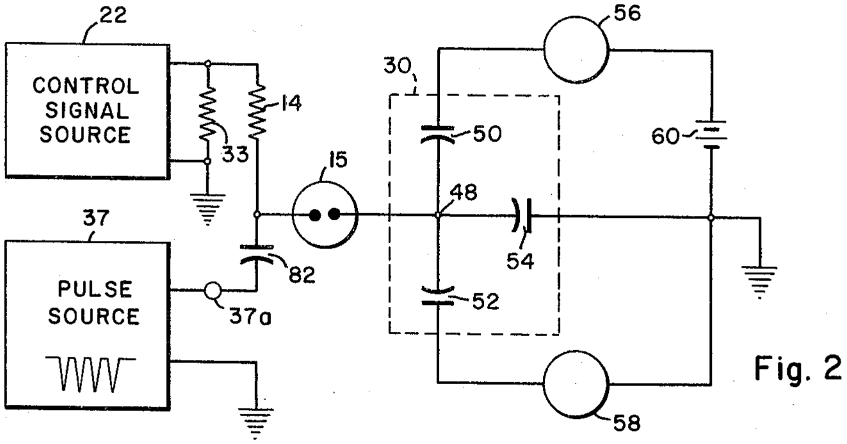
FIGURE 2 is a schematic diagram of one form of elementary signal commutation, signal storage, and light producing circuit in accordance with the invention.

In FIG. 2 there is shown an arrangement in accordance with the present invention which overcomes the foregoing uncertainty of previous spark gap switching mechanisms and which provides a highly satisfactory gas discharge signal gating arrangement. As shown in FIG. 2 video signal is derived from a signal source 22 and is applied by way of a signal bus and an isolating resistor 14 to one terminal of a spark gap device 15. The opposite terminal of spark gap 15 is connected to a potential storage element 54 which conveniently may be the electroluminescent capacitor of the elementary light producing unit 30. The spark gap 15 is operative when pulse actuated to pass or transfer a video control potential from the source 22 to storage capacitor 54.

The elementary light producing cell 30 may be of the type described in the aforementioned Toulon Patent 2,875,380 and includes a pair of non-linear dielectric capacitors 50 and 52 each having one electrode connected to the common terminal 48. Electroluminescent cell 54 is also comprised within the light producing element 30 and is connected between the common terminal 48 and a point of reference potential or ground. A first source of light power potential 56 is connected in series with the source of biasing potential 60 to the upper electrode of the non-linear dielectric capacitor 50. A second source of light power potential 58 is connected between the point of reference potential and the independent electrode of the second non-linear dielectric capacitor 52. The second light power potential source 58 applies an alternating current potential component across the electroluminescent element 54 and the non-linear dielectric capacitor 52 in series. The first light power potential source 56 applies an alternating current potential across the non-linear dielectric capacitor 50 and the electroluminescent element 54 in series.

By variation of the video control potential or direct current potential stored on the capacitor 54 the respective capacitances of the non-linear dielectric capacitors 50 and 52 may be oppositely varied. The parameters of the light producing device 30 are so proportioned that with zero direct current control potential at the common terminal 48 substantially no alternating current potential is applied to the electroluminescent element 54. That is true because with zero direct current voltage at 48 and taking into account the potential of biasing source 60, the reactances of the capacitive elements 50 and 52 are proportioned in the same ratio respectively as the alternating voltages of light power potential sources 56 and 58. Upon institution of a charge on capacitor 54 corresponding to an incremental portion of video control potential from source 22, the reactance of capacitor 50 will be substantially decreased while the reactance of capacitor 52 is substantially increased, thus upsetting the balance of the alternating current light power potentials from sources 56 and 58 so that electroluminescent element 54 is energized in proportion to the degree of such unbalance. Accordingly, element 54 generates light of an intensity corresponding to the magnitude of the video control potential temporarily stored in capacitor 54 and present at terminal 48.

In accordance with the present invention the spark gap switch means 15 is periodically actuated (for example at the 30 cycle per second television vertical frame rate) by application of a burst of signals from a pulse source 37. The pulse source 37 is connected by way of conductor 37*a* to the left-hand electrode of gap 15. To achieve improved consistency of conductivity in accordance with the present invention pulse source 37 is provided with parameters so proportioned that it provides a series or train of high amplitude voltage pulses during each switching interval. The strain of pulses preferably comprises at least three separate and individually distinct unidirectional pulses each having an individual duration of the order of 20 microseconds and with adjacent pulses having a time spacing therebetween of the order of 100 microseconds. I have found that the application of such a time sequential train of voltage pulses to spark gap 15 causes the storage capacitor 54 of a potential closely corresponding to the contemporary amplitude value of the video signal at the source 22. While the improved consistency of potential transfer is not fully and rigorously explained, it is experimentally demonstrable that multiple trigger pulse ionization of the gap 15 reduces the randomness of conductivity during the period when the capacitor 54 is being charged. In practice, I have found that unidirectional pulses of about 1600 volts amplitude, 20 microsecond duration and spaced 5 microseconds to 10 milliseconds apart are effective for actuating spark gaps which have intra-gap electrode spacings of about .003 inch. In one constructed embodiment, I have found that an interpulse time spacing of 10 milliseconds is convenient and adequate. To insure consistent potential transfer each spark gap actuation preferably should consist of a group of at least 3 to 5 such pulses occupying a total charge transfer time or signal gating time of perhaps 100 microseconds to 100 milliseconds. The voltage output from switch pulse source 37 is shown diagrammatically in FIG. 3 with the interpulse spacing within each burst of pulses being shown as 10 milliseconds and with the duration or thickness of each individual pulse being substantially smaller than the inter-pulse spacing.

Figures 3, 4, 5, 6:
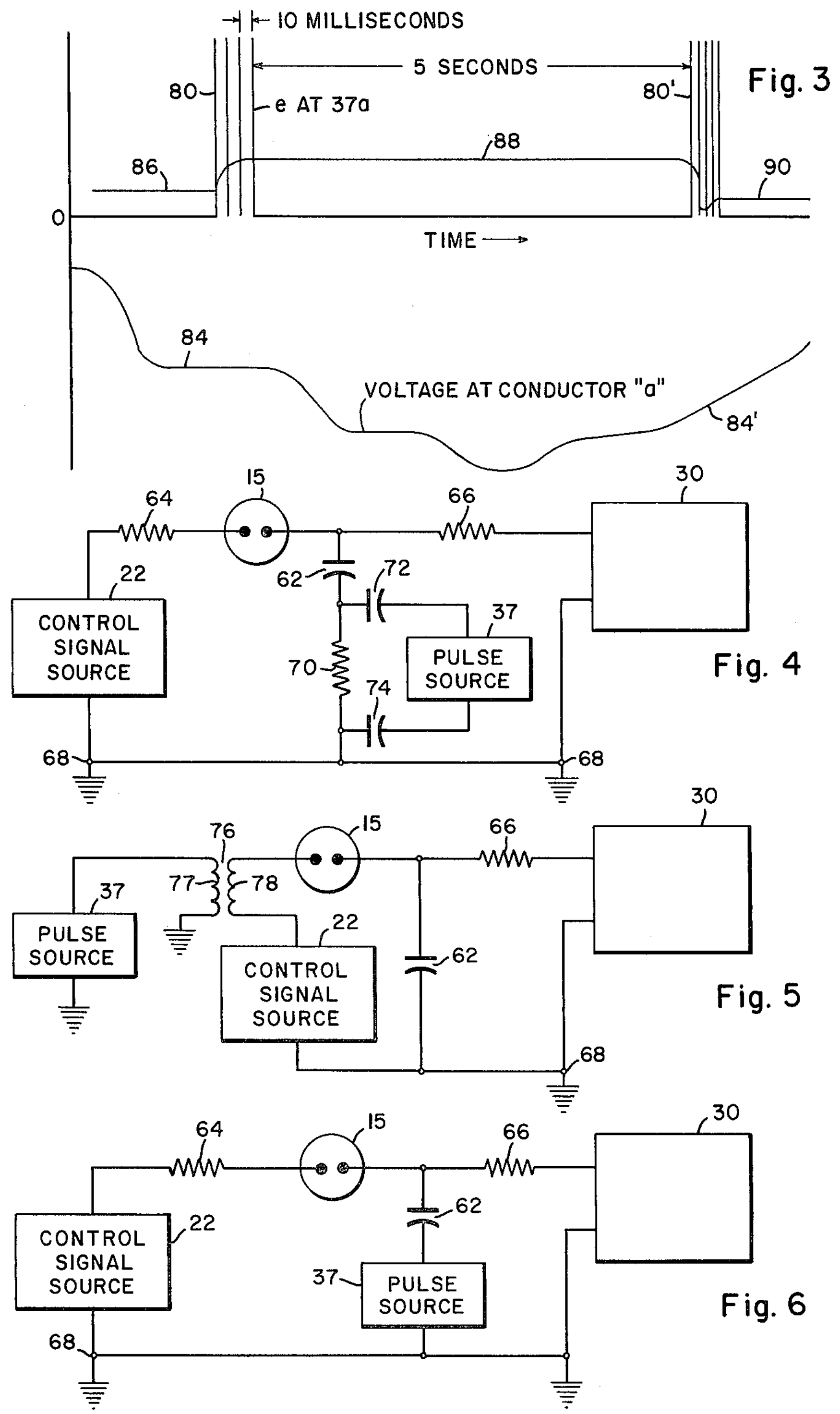
FIGURE 3 is a voltage waveform diagram illustrating the mode of operation of the circuit disclosed in FIGURE 2; and, FIGURES 4, 5 and 6 are circuit diagrams showing various modifications of the circuit system disclosed in FIGURE 2.

Prior art spark gap switching mechanisms did not permit gaps to be placed in close proximity physically, because intense ionization of the gas in the neighborhood of each spark gap would cause break-down or leakage of current across the physically adjacent gaps. In the prior art there was serious question about whether individual spark gaps could be grouped together as close as ⅛ inch between centers. The circuit configuration of FIG. 2 together with the multiple pulse switching burst as provided by source 37 has enabled signal distribution with great accuracy by means of spark gap switches, with no observable action between adjacent gaps in a given row of gaps, and with practically no observable interaction between gaps of adjacent rows. In several successful experiments, multiple gap structures have been constructed with the gaps spaced as close as 16 per linear inch without causing any deleterious interaction between adjacent gaps. It has been experimentally demonstrated that the uncertainty in stored potential, which had been characteristic of spark gap switching, is very substantially reduced by the use of a train or burst of unidirectional pulses as illustrated in FIG. 3. Preferably each pulse train should have at least 3 or 4 pulses. It appears from my experiments that 4 or 5 pulses in a train are adequate and that little or nothing is gained by the use of a greater number of pulses. Recurrent pulse trains as required by the present invention are readily generated by pulse generator circuit arrangements which are well known in the art.

The operation of the circuit of FIG. 2 can best be understood with reference to FIG. 3. In FIG. 3 the numeral 80 designates a recurrent burst of pulses as provided by the pulse source 37; that is, the waveform 80 represents the voltage appearing at conductor 37*a* and applied through capacitor 82 to initiate ionization of the spark gap 15. When a transilient pulse burst 80 is delivered from source 37 in conjunction with a continuously variable video signal from source 22 the two are additively combined at the left-hand electrode of the spark gap 15. When the gap 15 ionizes, so as to have a high conductivity, the capacitor 54 charges to a potential representative of the algebraic sum of the transilient pulse signal 80 and the video signal 84. Accordingly, assuming that the charge on capacitor 54 was initially at a level 86 the spark gap triggering pulse in combination with the video signal shifts the potential of capacitor 54 to the level 88 and capacitor 54 retains that average charge after the gap 15 de-ionizes and until such time as another triggering pulse 80′ is applied. When another pulse 80′ is applied as shown in FIG. 3, the potential of capacitor 54 will again be adjusted to a level depending on the contemporary instantaneous value of the video signal wave 84′. As indicated in FIG. 3, the instantaneous portion 84′ of the video wave may be more negative so that the action of the system is to slightly discharge the capacitor 54 to a new level 90 representative of the amplitude value of the portion 84′ of the video wave.

Thus, when a transilient potential impulse is delivered to the left-hand electrode of the spark gap 15 in conjunction with an intelligence signal from source 22 the two additively combine, ionize the spark gap 15 and then cause current flow through spark gap 15 to adjust the charge of capacitor 54 to a potential level representative of the instantaneous value of the video signal. This circuit system functions to store a potential proportional to the value of the intelligence signal at the instant that the transilient charging impulse is applied. The charging or discharging of the stored potential at a later time is effected by the application of the next succeeding triggering impulse 80′.

In the modification illustrated in FIG. 4, the spark gap does not operate directly to store a charge on the electroluminescent capacitor 54 as in the embodiment of FIG. 2, but rather an intermediate storage capacitor 62 is provided and when charged it continuously applies a control potential through isolating resistors 66 to the input terminals of a load 30 which may correspond to the composite element 30 of the circuit of FIG. 2. In the modification illustrated in FIG. 4, the left-hand electrode of the spark-gap 15 is connected through a current limiting resistor 64 to one terminal of the control signal source 22, the other terminal of which is grounded as designated at 68. Thus, upon ionization of the spark-gap 15 current is passed from source 22 to charge capacitor 62 to a level which varies as a function of the control signal amplitude at the switching times. In FIG. 4 switching pulses are applied to the spark-gap 15 by coupling through the charge storage capacitor 62. More exactly, the upper terminal of capacitor 62 is connected to the right-hand electrode of the spark-gap 15 and the lower electrode of capacitor 62 is connected through a resistor 70 to ground. A pulse source 37 has its respective terminals connected through coupling capacitors 72 and 74 to the opposite ends of resistor 70 so that the pulse source 37 develops pulses across resistor 70. Since the capacitor 62 and the control signal source 22 both have very low impedances at the frequencies of the transilient pulses from source 37, those pulses are effectively applied across the spark-gap 15 and act to ionize the same. The circuit of FIG. 4 is particularly advantageous in that it enables one terminal of the control signal source 22 to be connected to a point of reference potential or ground, and because it makes possible the use of a single pulse source 37 having a plurality of time sequential output terminals (such as an electromagnetic delay line) for applying pulses to the bottom terminals of a large plurality of capacitors 62.

In operation, when a transilient burst of pulses is provided by source 37 they appear across resistor 70 and are additively combined with the control signal from source 22 and applied across the series combination of capacitor 62 and spark gap device 15. The additive combination of the transilient pulses and the control signal operate to charge the capacitor 62 to a level proportional to the algebraic sum and representative of the instantaneous value of the input control signal.

Referring now to FIG. 5, in this particular embodiment of the invention, the charge storage capacitor 62 has its lower terminal connected to ground and has its upper terminal connected through the isolating resistor 66 to the load 30. When charged, capacitor 62 will provide a bias potential through resistor 66 to control any low current voltage responsive load such as for example an electroluminescent ferro-electric display screen element as described in detail in connection with FIGS. 1 and 2. The embodiment of FIG. 5 differs from FIG. 4 in that the video input signal from source 22 and the pulses from source 37 are additively combined and applied between the left-hand electrode of the spark-gap 15 and ground. Additive mixing of the two input signals is achieved by a pulse coupling transformer 76 which has its primary winding 77 connected across pulse source 37 and which has its secondary winding 78 connected in series with the pulse source 22 between the spark-gap 15 and ground. Thus, the algebraic sum of the video control signal and keying pulses is applied across the series combination of the spark gap device 15 and the charge storage capacitor 62.

In the functioning of this embodiment of the invention, the transilient pulse potential provided by way of transformer 76 is coupled through the low RF impedance of capacitor 62 and is effectively applied across the terminals of spark-gap 15 to ionize the same so that during the ionization period, capacitor 62 is permitted to charge to a potential level dependent upon the contemporary instantaneous value of the input signal from source 22. Upon the cessation of the transilient burst of keying pulses 80 spark-gap 15 immediately de-ionizes thereby trapping a signal representative charge on the capacitor 62 which charge is retained thereon and applied to control the voltage responsive load 30 until such time as the charge of capacitor 62 is re-adjusted by application of a next sequential burst of keying pulses 80′ in conjunction with a new value 84′ of control signal.

In the embodiment of FIG. 6, the circuit arrangement is generally similar to that of FIG. 4 except that the pulse source 37 is directly connected in series with the storage capacitor 62 between the right-hand electrode of the spark-gap 15 and ground.

In operation, the circuit of FIG. 6 is substantially identical to FIGS. 4 and 5. The signals from video source 22 and pulse source 37 are additively combined and applied across the series combination of spark-gap 15 and charge storage capacitor 62. Upon the cessation of the triggering pulse train from source 37 the capacitor 62 is charged to a level representative of the instantaneous value of the video signal and capacitor 62 retains that charge and applies the same by way of isolating resistor 66 to a load 30 or any other analogous voltage responsive output circuit.

The various embodiments of the present invention are particularly advantageous in display systems utilizing hundreds or thousands of separate light producing elements as stated heretofore in connection with FIG. 1. The present invention enables distribution of control potentials to such elements without the use of rotating commutator mechanisms, and without the use of large pluralities of semiconductor diodes, pulse transformers or other extensively duplicated and high cost electronic switch devices. In the system of the present invention, the only elements which must be provided in large numbers are the spark-gaps 15, the charge storage capacitors 62, and the light emittive load elements 30. Multiple arrays of the spark gap elements 15 may be constructed at very low cost and to occupy a very substantially smaller space than prior art arrangements for performing the same functions.

In summary, the present invention provides a signal distribution system which may be advantageously utilized in television, radar or the like apparatus for distributing a control signal sequentially representative of successive bits of intelligence to a plurality of separate and distinct utilization channels. The signal distribution system includes, for each separate and distinct signal output channel, a spark gap device and a charge storage element connected in a series circuit. The potential storage elements are individually connected to apply signals representative of different time sequential portions of an information signal to different ones of the output channels. The gas discharge device or spark gap switching devices are independently connected and independently actuated to periodically transmit signals from the common source of information bearing signal to their respective signal storage elements. In order to sequentially and individually actuate the different switching devices, there is provided a source of recurrent trains of transient keying pulses which source is interconnected to all of the different pulse actuated switching devices of the system so as to sequentially apply pulses to successive ones of the spark gap switching devices.

The following table shows by way of example particular values and parameters for the various components and impedances in a circuit corresponding to that of applicant's FIG. 4 which has been operated successfully. These component values and parameters are set forth by way of example only, and the invention is not limited to these values nor to any of them.

*Table I*

| | |
|---|---|
| Capacitor **72** | Microfarads 0.85. |
| Capacitor **62** | 1000 micromicrofarads. |
| Resistor **70** | 2200 ohms. |
| Resistor **64** | 100K ohms. |
| Resistor **66** | 22 megohms. |
| Spark-gap **15** inter-electrode spacing | .0028 inch. |
| Intra-gap spacing | .0625 inch. |
| Pulse burst **80** | 1600 volts peak. |
| Burst duration | About 400 microseconds. |
| Individual pulse duration | 20 microseconds. |

While I have shown and described certain preferred embodiments of my invention, it will be obvious to those skilled in the art that it is not so limited but is susceptible of various changes and modifications without departing from the spirit and scope thereof.

I claim as my invention:

1. In combination, a control signal source, a direct current series circuit, including a spark gap device and a capacitor connected to said source in a manner such that when said spark gap is rendered conductive said capacitor charges to a potential representative of the instantaneous amplitude of said control signal, and means for applying a periodic potential to said series circuit and having parameters so proportioned that said periodic potential is effective to cause said spark gap device to accurately charge said capacitor to a potential representative of the instantaneous amplitude value of said control signal; said means comprising means to periodically provide a burst of at least three closely spaced voltage pulses each exceeding the breakdown potential of said spark gap.

2. In a system for providing a continuous output signal corresponding to an instantaneous amplitude value of a time varying input signal; a capacitor; a spark gap connected in a series circuit with said capacitor; means for applying said input signal to the series combination of said gap and said capacitor; means for supplying a periodically recurrent potential to said series circuit and having parameters so proportioned that said recurrent potential has amplitude and duration values effective to cause said spark gap to charge said capacitor in proportion to the instantaneous amplitude value of said input signal at the times of periodic recurrence of said potential to develop in said capacitor a control signal having an amplitude determined by said instantaneous amplitude value; said means for supplying recurrent potential comprising means to periodically provide a train of at least three closely spaced time separated voltage pulses exceeding the breakdown potential of said spark gap.

3. In a circuit system for utilizing an intelligence signal for performing control functions, storage means for storing a charge representative of a portion of said signal, a spark gap device connected in series with said storage means, a source of intelligence signal, a source of voltage pulses and circuit means connected to said sources for additively combining said intelligence signals and said voltage pulses and connected to the series combination of said storage means and said device for applying said pulses and signals in additive combination across said storage means and said spark gap device to render said spark gap conductive during a predetermined time interval corresponding to an incremental portion of said signal, said pulse source being characterized in that it periodically provides a plurality of closely spaced separate voltage pulses during said charging interval.

4. A system for charging a capacitor in accordance with the amplitude of a signal at selected charging time intervals comprising a normally nonconductive spark gap device which is rendered highly conductive in response to application of voltages exceeding a predetermined amplitude level, said spark gap device and said capacitor being serially connected between a pair of input terminals, a source of information bearing signals, circuit means connected to said signal source for applying said signals across said input terminals, a source of recurrent voltage pulses, circuit means connected to said source of pulses for applying pulses between said input terminals at selected times and additively with said information bearing signals, said spark gap device normally blocking said capacitor against charge in response to said signal, said voltage pulses being coupled to said spark gap device so that said spark gap device is rendered conductive by pulses exceeding said predetermined amplitude level, with said source of pulses being adapted to periodically provide a train of at least three closely spaced pulses exceeding said amplitude level during each selected charging time interval.

5. In an intelligence signal storage system, charge storage means for storing charges representative of instantaneous values of an intelligence signal; a normally nonconductive spark gap device connected in series with said charge storage means between a pair of input terminals, said spark gap device exhibiting a relatively high resistance when subjected to voltages within a predetermined amplitude range and a relatively low incremental resistance when subjected to breakdown voltages exceeding said amplitude range; a source of intelligence signal; a source of time-spaced switching voltage pulses; circuit means coupling said signal source and said input terminals for applying said intelligence signal across the series combination of said spark gap device and said storage means in a manner such that said spark gap device normally blocks the passage of said intelligence signal to said storage means; and circuit means coupling said source of voltage pulses and said input terminals for applying said voltage pulses across said series combination in a manner to render said spark gap device conductive during selected charging intervals to permit charging of said storage means therethrough, said pulse source comprising means to periodically provide a train of distinct closely spaced voltage pulses during each of said charging time intervals, with each train comprising at least three pulses and with each pulse having a time duration substantially smaller than the time-spacing between adjacent pulses of the train.

6. In an electrical system, a source of intelligence bearing signal, a source of periodic current power having an output voltage which includes an alternating component, means for modulating said output voltage in accordance with variations in amplitude of said intelligence bearing signal, said means comprising at least one nonlinear dielectric capacitor characterized by exhibition of alternating current impedance which varies as a function of instantaneous potential thereacross, power utilization means coupled in series with said capacitor across said source of power, means including a spark gap switching device connected between said source of intelligence bearing signal and said capacitor for recurrently charging said capacitor to a potential representative of an instantaneous amplitude of said intelligence bearing signal, and switch actuating means for periodically applying groups of closely spaced voltage pulses to said spark gap device.

7. In an image display apparatus in which an electroluminescent cell is coupled in series with at least one nonlinear dielectric capacitive element to a source of periodic current power so that energization of said cell is controlled by division of the output voltage of said source between said cell and said element in accordance with the relative reactances thereof, a source of varying amplitude intelligence bearing control signal, a source of time space pulse signals, a spark gap switching device having first and second terminals with said first terminal connected to the common junction of said cell and said capacitive element, means for applying said control signal to said second terminal, and means for utilizing said time spaced pulse signals to recurrently alter the relative potentials of said first and second terminals and render said switching device conductive to charge said capacitive element to a direct-current voltage level dependent upon the instantaneous amplitude of said control signal and said electroluminescent cell is thereafter energized in proportion to said level, said source of time spaced pulse signals comprising means for providing time spaced bursts of closely spaced pulses with the interpulse time spacings being at least as large as the individual pulse durations and with each burst including at least three individually distinct pulses.

8. In combination: a control signal source having a load impedance, a direct-current series circuit, including a spark gap device and a capacitor connected to said load impedance in a manner such that when said spark gap is rendered conductive said capacitor charges to a potential corresponding to the instantaneous amplitude of said control signal, and means for applying a periodic potential to said series circuit and having parameters so proportioned that said periodic potential is effective to cause said spark gap device to accurately charge said capacitor to a potential representative of the instantaneous amplitude value of said control signal; said means comprising means to periodically provide a burst of at least three closely spaced voltage pulses each exceeding the breakdown potential of said spark gap with each of said pulses having a duration of the order of 20 microseconds and with the time intervals between adjacent pulses being at least of the order of 10 microseconds.

References Cited by the Examiner

UNITED STATES PATENTS

| | | | |
|---|---|---|---|
| 2,464,279 | 3/49 | Zarem | 320—1 |
| 2,596,984 | 5/52 | Cook | 320—1 X |
| 2,741,756 | 4/56 | Stock | 320—1 X |
| 2,828,447 | 3/58 | Mauchly | 340—173 |
| 2,906,962 | 9/59 | Roth | 320—1 X |
| 2,917,667 | 12/59 | Sack | 313—108.1 X |
| 2,925,585 | 2/60 | Bruce | 320—1 X |
| 2,961,537 | 11/60 | Turner | 320—1 X |
| 3,093,770 | 6/63 | Wesley et al. | 320—1 |

IRVING L. SRAGOW, *Primary Examiner.*